United States Patent
Vranicar

Patent Number: 6,161,872
Date of Patent: Dec. 19, 2000

[54] BREAKAWAY CONNECTOR FOR COMPRESSED NATURAL GAS HOSES

[75] Inventor: John J. Vranicar, Concord, Calif.

[73] Assignee: Pacific Gas and Electric Company, San Francisco, Calif.

[21] Appl. No.: 09/172,753

[22] Filed: Oct. 14, 1998

[51] Int. Cl.⁷ .................................................. F16L 35/00
[52] U.S. Cl. .................................. 285/1; 285/2; 285/265; 239/600; 141/388
[58] Field of Search ............................. 285/1, 2, 18, 114, 285/264, 265, 223; 239/587.1–587.5, 588, 600; 138/155, 120, 114; 141/388

[56] References Cited

U.S. PATENT DOCUMENTS

| | | | |
|---|---|---|---|
| 2,701,147 | 2/1955 | Summerville | 285/1 |
| 3,013,819 | 12/1961 | Reed et al. | 285/1 |
| 4,153,112 | 5/1979 | Luke | 285/265 |
| 4,269,226 | 5/1981 | Allread | 285/1 |
| 4,533,161 | 8/1985 | Burke et al. | 285/1 |
| 4,800,913 | 1/1989 | Nitzberg et al. | 285/1 |
| 5,454,602 | 10/1995 | Anderson et al. | 285/1 |
| 5,520,418 | 5/1996 | Burke | 285/2 |
| 5,564,471 | 10/1996 | Wilder et al. | 285/1 |

*Primary Examiner*—Lynne H. Browne
*Assistant Examiner*—Tomlyne Malcolm
*Attorney, Agent, or Firm*—Townsend and Townsend and Crew LLP

[57] ABSTRACT

A breakaway system for a compressed natural gas fueling hose. The system includes an upper ring that surrounds the fueling hose. A lower portion includes three concentric disks that are arranged as a gimbals. An outer disk is coupled to the upper ring with three rods. The lower portion surrounds a male connector. A female connector, generally of the type known a quick-release connector, is coupled to the fueling hose. When the female connector is connected to the male connector, an outer sleeve of the female connector engages the inner disk of the gimbals. When a lateral force is exerted by the hose against the upper ring, the rods cause at least the outer ring to tilt relative to the male connector. Because of the gimbals arrangement, the inner disk always remains substantially flat and thus exerts a force against the sleeve thereby disconnecting the female connector from the male connector.

20 Claims, 5 Drawing Sheets

BREAKAWAY CONNECTOR FOR COMPRESSED NATURAL GAS HOSES

BACKGROUND OF THE INVENTION

1. Field of the Invention

The present invention relates to a breakaway connector system, and more particularly, to a breakaway connection system for a compressed natural gas fueling hose.

2. Description of the Prior Art

Stations or terminals for dispensing fuel such as gasoline and natural gas are well known. These terminals generally include hoses that are attached to a tower and have a nozzle at the end for communication with a receptacle for receiving the fuel.

With terminals that dispense compressed natural gas, the terminal generally includes a base plate that is attached to the fill post or dispenser. The compressed natural gas process tubing passes through the base plate and terminates in a male fitting that in turn connects with a female disconnect device attached to a fueling hose. Generally, the female disconnect device is a quick-release type of connector that is well known in the art. Such a quick-release type of connector includes an inner sleeve or main body that has a plurality of ball bearings embedded therein. An outer sleeve is biased over the inner sleeve and can move over the inner sleeve on the ball bearings. Inside the connector is a biased plug that generally keeps the connector closed. The cooperating male connector also includes a biased plug. When the female connector is attached to the male connector, the two biased plugs are forced into open positions such that the hose now communicates with the dispensing station.

The pressure in the fueling hose is 3000 or more p.s.i., which results in at least 800 p.s.i. at the joint formed by the interconnected male and female couplings.

A problem occurs when a vehicle that is being fueled at the fueling station drives away before the fueling hose is removed from the vehicle fuel tank intake. Generally, when this occurs, the fueling hose breaks away at the aforementioned male connector, basically "snapping it off." This is dangerous and costly.

A prior attempt at avoiding the problem of snapping off the male connector consists of a tower-type breakaway device that consists of a large ring and a second upper ring separated by rod(s) or tubing. The length of the rod determines the mechanical advantage of the device. The fueling hose and female disconnect connector pass through the upper ring but not the lower larger ring. The large ring fits over the male fitting attached to the base plate allowing the male and female fittings to connect. A lateral pull on the fueling hose causes the upper ring to move in the same direction which in turn results in the lower ring tilting. The lower ring cannot pass by the sleeve on the female quick release fitting and thus causes the sleeve to begin to slide, which in turn is intended to release the female coupling.

However, since the lower ring is tilting, it only catches one edge of the outer sleeve, which results in the sleeve actually binding on the female fitting rather than releasing the female fitting. This binding prevents the release of the female connector and results in breakage of parts and the release of compressed natural gas. Attempts at correcting this problem have included "cocking" the outer sleeve over the ball bearings so that it can easily lift off. This is not safe and is also time consuming in that it takes up to two hours to properly set or "cock" the outer sleeve. Additionally, since the ball bearings are now partially exposed to the outer elements, corrosion often occurs and accordingly, the female coupling still will not release.

SUMMARY OF THE INVENTION

A connection system including a breakaway device in accordance with the present invention addresses the shortcomings of the prior art.

In accordance with one aspect of the present invention, a delivery system that delivers at least one of liquids and gases includes a supply conduit in communication with a supply source, a delivery conduit and a connection system. The connection system includes a male connector coupled to the supply conduit at an end opposite the supply source, a female connector coupled to the delivery conduit and configured for connection to the male connector and a disconnect apparatus that surrounds a base of the male connector when the female connector is connected to the male connector. The disconnect apparatus is at least engagable with a lip of the female connector when the female connector is connected to the male connector. The disconnect apparatus includes at least two concentric sections that are pivotably connected. The system also includes structure for causing the disconnect apparatus to engage the lip of the female connector. Such structure for causing the disconnect apparatus to engage the lip is connected to the disconnect apparatus and is at least engagable with the delivery conduit.

In accordance with another aspect of the present invention, the disconnect apparatus includes three concentric disks pivotably arranged as a gimbals.

In accordance with a further aspect of the present invention, the structure for causing the disconnect apparatus to engage the lip includes a ring surrounding the delivery conduit and a least one rod connected to the ring and the disconnect apparatus.

In accordance with yet another aspect of the present invention, the gimbals is reversible to accommodate larger bases of the male connector.

In accordance with a further aspect of the present invention, the system includes means for inhibiting movement of the concentric sections relative to the male connector until a predetermined amount of force is exceeded.

Thus, the present invention permits the force of the disconnect apparatus to evenly act upon the lip of the female connector. When the lip of the female connector is an outer sleeve of a quick release connector, this evenly applied force acts upon the entire outer, sliding sleeve of the female connector in such an even manner that the outer sleeve raises substantially evenly thus preventing binding of the sleeve. This allows the female connector to "breakaway" or disconnect from the male connector, thereby preventing breaking of the male connector.

Furthermore, the use of structure for preventing movement of the concentric sections relative to the male connector allows for prevention of premature disconnecting of the female connector from the male connector during situations such as merely pulling on the hose to extend it to reach the fuel tank of a vehicle.

Other features and advantages of the present invention will be understood upon reading and understanding the detailed description of the preferred exemplary embodiments found hereinbelow in conjunction with reference to the drawings, in which like numerals represent like elements.

DETAILED DESCRIPTION OF THE PREFERRED EXEMPLARY EMBODIMENTS

Figure 1:
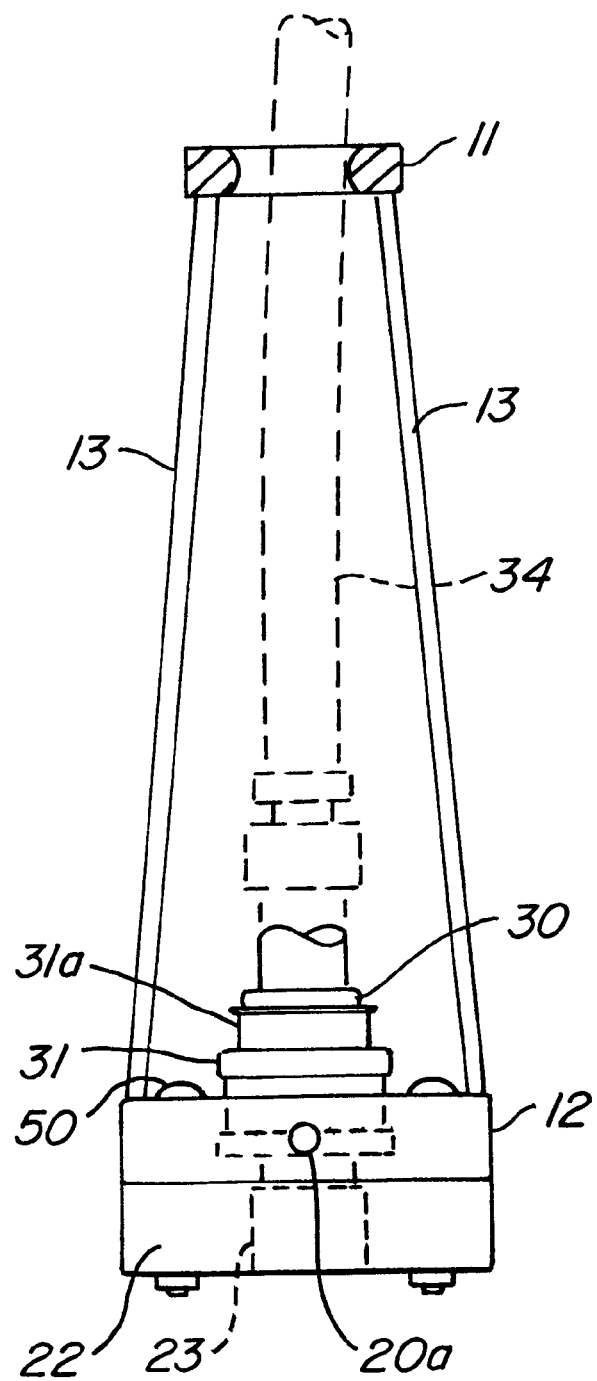
FIG. 1 is a side elevation view of a disconnect apparatus in accordance with the present invention.
Figure 2:
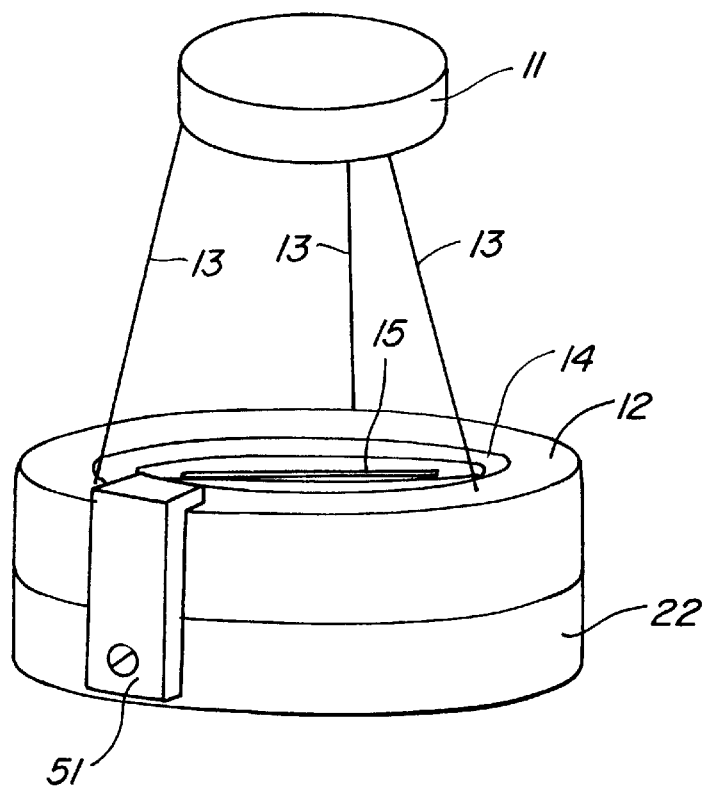
FIG. 2 is a perspective view of a disconnect apparatus in accordance with present invention illustrating an alternative way to prevent premature disconnection.

FIG. 1 illustrates a disconnect apparatus 10. The apparatus preferably includes an upper ring 11 and a lower ring 12. The upper ring and lower ring are preferably coupled by three rods 13. More or fewer rods may be used as desired. The rods may be coupled to the rings in any suitable manner such as, for example, welding, integral formation of the rings and rods, etc. Additionally, the rods may be threaded and thus screwed into the rings or bolted thereto with nuts.

Figure 3:
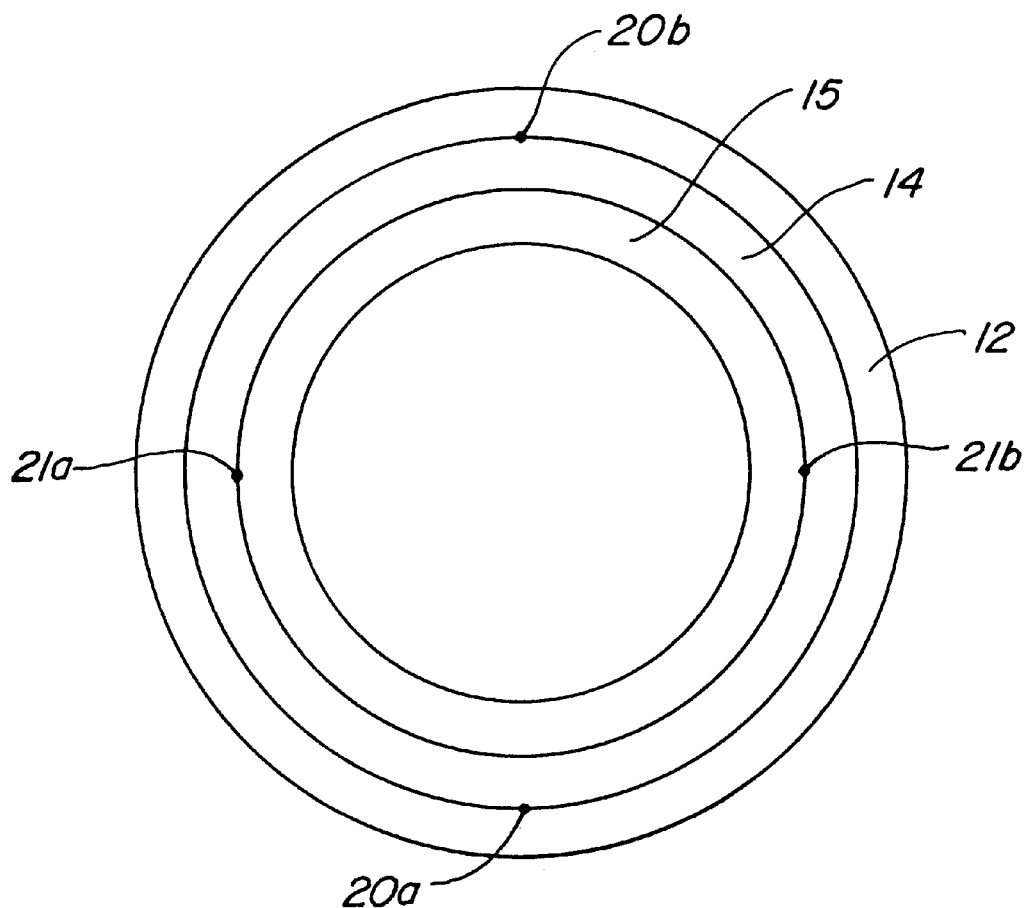
FIG. 3 is a top plan view of the three concentric disks of the disconnect apparatus arranged as a gimbals.

Two concentric rings 14, 15 are preferably pivotably connected within lower ring 12. As can be seen in FIG. 3, preferably the three rings 12, 14, 15 are pivotably arranged as a gimbals. Hence, middle ring 14 is pivotably coupled to lower ring 12 at coupling points 20a, b while inner ring 15 is pivotably coupled to concentric ring 14 at coupling points 21a, b that are 90 degrees from coupling points 20a, b. The rings may be coupled in any suitable manner that allows them to freely pivot with respect to one another.

Disconnect apparatus 10 is used by placing it adjacent a base plate 22 of a dispensing station (not shown). Adjacent the base plate is a male connector 23 that includes as base 23a. The male connector is coupled to a supply conduit 24 that is communication with a supply source 25. A female connector 30, generally of a type known as a quick-release type connector, includes an outer sleeve 31 and a main body 31a. The outer sleeve engages a plurality of ball bearings (not shown). The outer sleeve is biased so that its bottom lip 32 is substantially flush with a bottom lip 33 of the main body of female connector 30. The plurality of ball bearings are embedded within the main body of the female connector between main body 31 a and outer sleeve 31. The female connector 30 is coupled to a delivery conduit 34.

In use, disconnect apparatus 10 is placed adjacent base plate 22 such that upper ring 11 surrounds delivery conduit 34 and rings 12, 14, 15 are adjacent base plate 22 with inner ring 15 surrounding male connector 23. Inner diameter of inner ring 15 is such that inner ring 15 is engagable with lip 32 of sleeve 31 but not with lip 33 of the main body of female connector 30.

Accordingly, when delivery conduit 34 applies force against upper ring 11, lower ring 12 will begin to tilt or move away from base plate 22 due to the coupling of upper ring 11 and lower ring 12 by rods 13. Depending on the point of movement of lower ring 12, middle ring 14 may also begin to tilt away from base plate 22. If lower ring 12 is moving close to a coupling point 20a, b, then middle ring 14 will also tilt. However, because inner ring 15 is connected to middle ring 14 at coupling points 21a, b that are 45 degrees from coupling points 20a, b, inner ring 15 will remain level while middle ring 14 and lower ring 12 pivot with respect to inner ring 15. Thus, inner ring 15 will be moved against lip 32 such that it moves outer sleeve 31 over the ball bearings and the main body of connector 30. Continued application of force by delivery conduit 34 against upper ring 11 will continue to raise the rings 12, 14, 15 such that sleeve 31 will cause female connector 30 to disconnect from male connector 23.

If the tilting movement of lower ring 12 is fairly close to coupling points 21a, b, then middle ring 14 will remain substantially level with respect to the bottom lip 32 of the outer sleeve 31 and thus, lower ring 12 will pivot with respect to rings 14, 15. Accordingly, disconnect apparatus 10 may be designed such that only one ring is placed concentric with respect to lower ring 12. However, disconnect apparatus 10 would need to be placed in relation to delivery conduit 34 such that tilting movement of lower ring 12 would always be away from coupling points 20a, b and thus lower ring 12 would pivot with respect to the single interior concentric ring and the single interior concentric ring would apply an even force against sleeve 31 of female connector 30.

Figure 4:
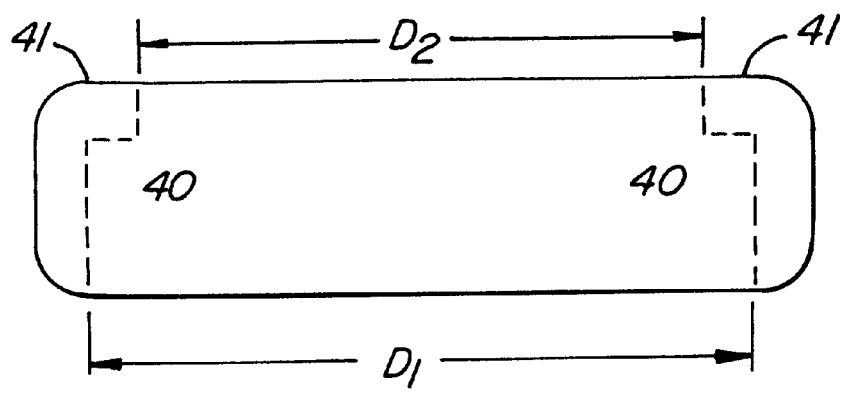
FIG. 4 is a side elevation view of the center ring of the gimbals arrangement illustrated in FIG. 3.
Figure 6:
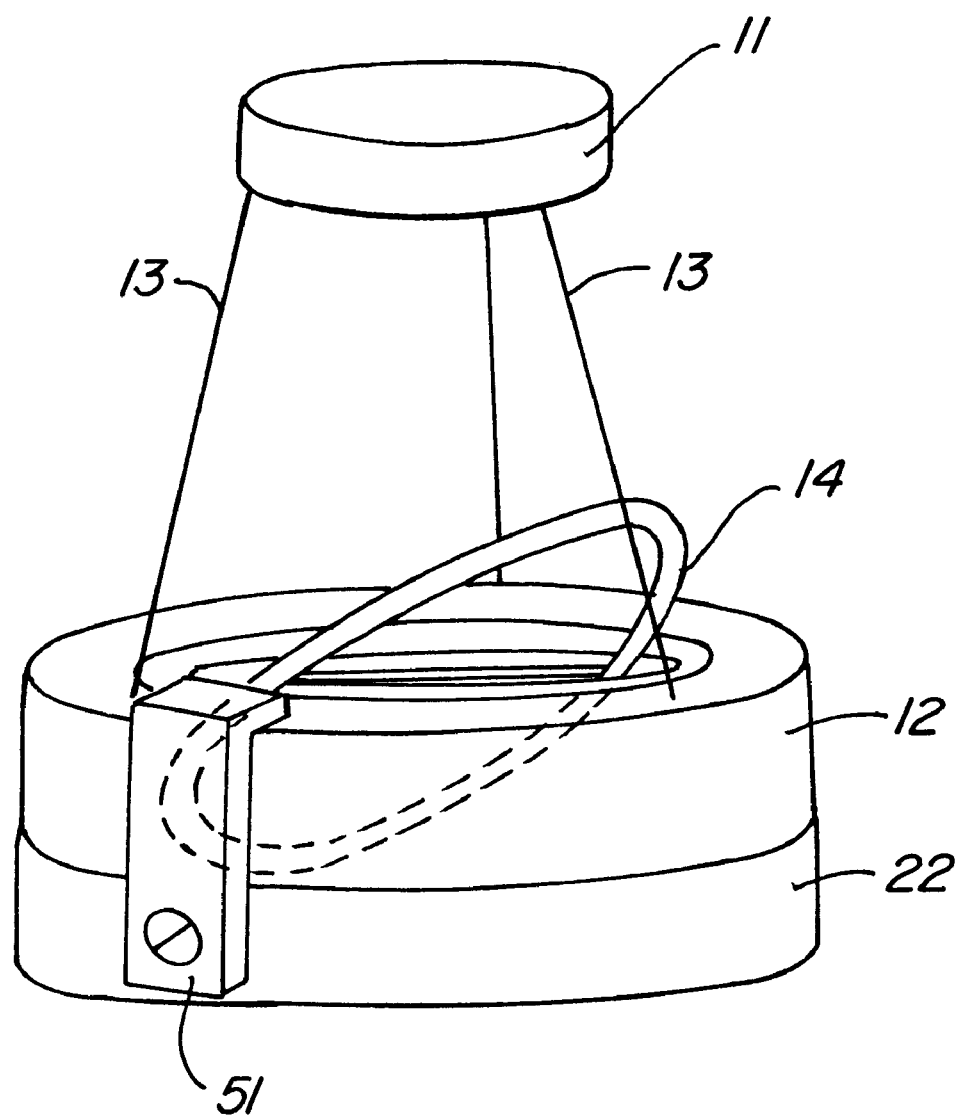
FIG. 6 is a perspective view of the disconnect apparatus illustrated in FIG. 2 illustrating the interior disks in a pivoted position.
Figure 7:
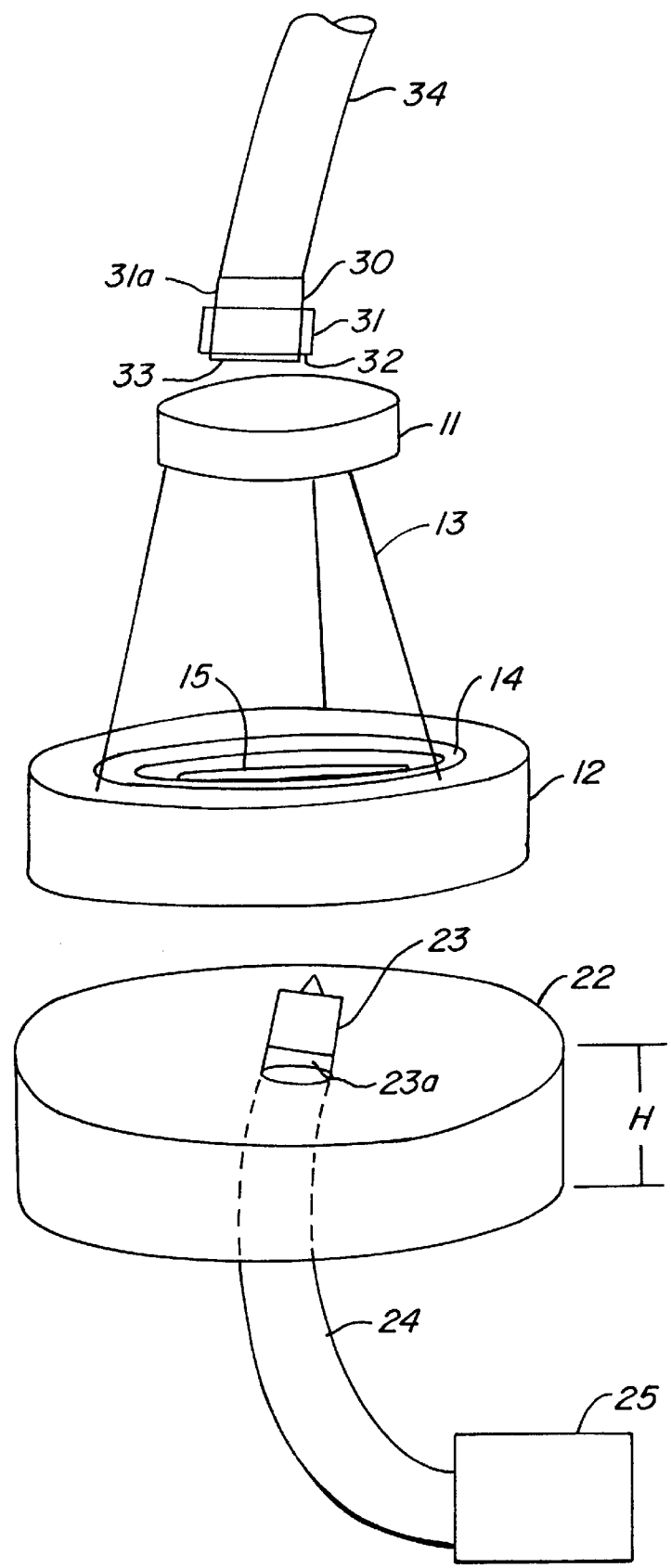
FIG. 7 is an exploded view illustrating the connection system of the present invention.

Some base plates are larger, i.e., have a larger height H, such that base 23a of male connector 23 would not pass through inner ring 15 far enough to allow for proper connection between male connector 23 and female connector 30 when disconnect apparatus 10 is used. Accordingly, as can be seen in FIG. 4, inner ring 15 has a stepped inner diameter. Thus, by rotating rings 14, 15, the inner diameter of inner ring 15 may effectively be changed. If the rings are arranged such that larger inner diameter $D_1$ is facing upper ring 11, then lip 32 of sleeve 31 will engage surface 40. Alternatively, if rings 14, 15 are positioned such that smaller inner diameter $D_2$ of ring 15 is facing upper ring 11, then bottom lip 32 of sleeve 31 will engage surface 41.

While the dimensions for disconnect apparatus 10 are determined based upon the dimensions of the male and female connectors, in one embodiment, the larger diameter $D_1$ is equal to approximately 1 inch while the smaller $D_2$ is equal to approximately 0.750 inches.

In a preferred embodiment, structure is provided for preventing movement of lower ring 12 away from base plate 22 until a predetermined amount of force is applied. Preferably, the predetermined threshold of force is 40 pounds. FIG. 1 illustrates an arrangement wherein plastic screws 50 are used to connect lower ring 12 to base plate 22. The screws are chosen such that the fail point is equal to the threshold of force desired.

Figures 5A, 5B:
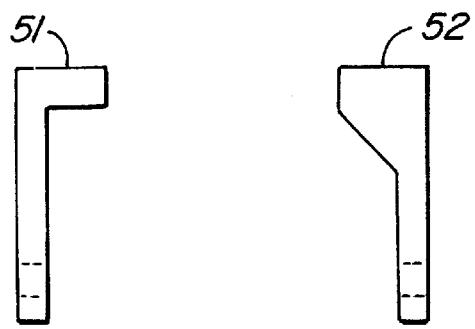
FIGS. 5a, b and c are elevation views of various structure for use with the disconnect apparatus for inhibiting premature disconnection of the female connector from the male connector.

FIG. 5a illustrates an example of a bracket that may be attached at points around the periphery of base plate 22 and lower ring 12. The brackets may be made of a material suitable to withstand force up to the desired threshold. FIG. 5b illustrates a second example of a bracket for inhibiting movement between lower ring 12 and base plate 22 until a predetermined threshold of force is applied.

Figure 5C:
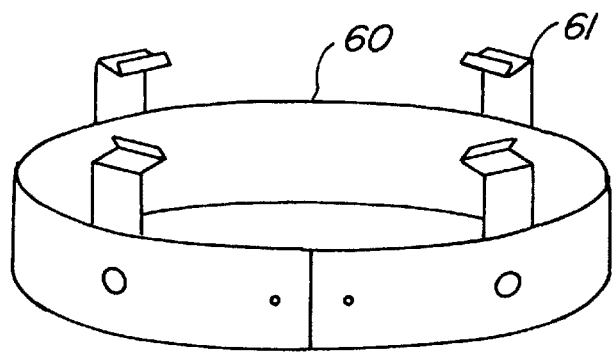

FIG. 5c illustrates yet another apparatus for inhibiting movement between lower ring 12 and base plate 22 until a predetermined threshold of force is exceeded. The apparatus includes a ring or band 60 that includes a plurality of clips 61. and 60 is placed around base plate 22 such that clips 61 extend over and engage the top urface of lower ring 12.

Furthermore, rods 13 may be made flexible such that they flex until a predetermined threshold of force is exceeded. Once this threshold of force is exceeded, the rods would no longer flex and lower ring 12 would begin to move relative to base plate 22.

Another embodiment wherein flexing structure may be used to inhibit premature disconnection of the female connector from the male connector includes ropes, chains or the like, (not shown) that replace rods 13 and upper ring 11 (if desired). The ropes would be tied or coupled directly to delivery conduit 34 and to lower ring 12. Enough slack would be provided such that the strings or rope would become taught once the level of force has been exceeded. Alternatively, upper ring II may be coupled directly to delivery conduit and the ropes may be coupled to upper ring 11 and lower ring 12. As many ropes may be used as desired.

Disconnect apparatus 10 is ideally suited for use with compressed natural gas dispensers. However, it should be readily apparent that it may be used with any type of system that includes a male connector and a female connector that is similar to a quick-release type connector.

Although the invention has been described with reference to specific exemplary embodiments, it will be appreciated that it is intended to cover all modifications and equivalents within the scope of the appended claims.

What is claimed is:

1. A delivery system that delivers at least one of liquids and gases, the system comprising:
    a supply conduit in communication with a supply source;
    a delivery conduit; and
    a connection system comprising:
        a male connector coupled to the supply conduit at an end opposite the supply source;
        a female connector coupled to the delivery conduit and configured for connection to the male connector;
        a disconnect apparatus that surrounds a base of the male connector when the female connector is connected to the male connector and that is at least engageable with a lip of the female connector when the female connector is connected to the male connector, the disconnect apparatus comprising at least two concentric disks that are pivotably arranged as a gimbal; and
        means for causing the disconnect apparatus to engage the lip of the female connector, the means for causing the disconnect apparatus to engage the lip being connected to the disconnect apparatus and being at least engageable with the delivery conduit.

2. The delivery system of claim 1 wherein the disconnect apparatus comprises three concentric disks pivotably arranged as a gimbal.

3. The delivery system of claim 1 wherein the means for causing the disconnect apparatus to engage the lip comprises a ring surrounding the delivery conduit and at least one rod connected to the ring and the disconnect apparatus.

4. The delivery system of claim 2 wherein the gimbal is reversible.

5. The delivery system of claim 1 wherein the female connector is a quick-release-type connector.

6. The delivery system of claim 1 further comprising means for inhibiting movement of the concentric sections relative to the male connector until a predetermined amount of force is exceeded.

7. A delivery system that delivers at least one of liquids and gases, the system comprising:
    a supply conduit in communication with a supply source;
    a delivery conduit; and
    a connection system comprising:
        a male connector coupled to the supply conduit at an end opposite the supply source;
        a female connector coupled to the delivery conduit and configured for connection to the male connector; and
        a disconnect apparatus that surrounds a base of the male connector when the female connector is connected to the male connector and that is at least engageable with a lip of the female connector when the female connector is connected to the male connector, the disconnect apparatus comprising at least three concentric sections that are pivotably arranged as a gimbal, a ring surrounding the delivery conduit with at least one rod coupled to the ring and an outer one of the three concentric sections and extending there between.

8. The delivery system of claim 7 wherein two rods are connected to the ring and an outer one of the three concentric sections.

9. The delivery system of claim 8 wherein three rods are connected to the ring and an outer one of the three concentric sections.

10. The delivery system of claim 7 wherein the gimbal is reversible.

11. The delivery system of claim 7 wherein the female connector is a quick-release-type connector.

12. The delivery system of claim 7 further comprising means for inhibiting movement of the gimbals relative to the male connector until a predetermined amount of force is exceeded.

13. A compressed natural gas delivery system comprising:
    a delivery base;
    a supply conduit in communication with a supply source;
    a supply nozzle coupled to the supply conduit at an end opposite the supply source and supported by the base;
    a delivery conduit;
    a delivery nozzle coupled to the delivery conduit and configured to mate with the supply nozzle to form a connection; and
    a breakaway system comprising:
        a base section including at least two concentric disks, a center disk surrounding a portion of the supply nozzle and being pivotably coupled to an adjacent disk the center disk and adjacent disk being pivotably arranged as a gimbal, the center disk being engageable with a lip of the delivery nozzle; and
        means for causing the center disk to engage the lip of the delivery connector, the means for causing the center disk to engage the lip being coupled to the base section and being at least engageable with the delivery conduit.

14. The gas delivery system of claim 13 wherein the base section comprises three concentric disks pivotably arranged as a gimbal.

15. The gas delivery system of claim 13 wherein the means for causing the center section to engage the lip comprises a ring surrounding the delivery conduit and at least one rod coupled to the ring and an outer concentric section.

16. The gas delivery system of claim 14 wherein the gimbal is reversible.

17. The gas delivery system of claim 13 wherein the supply nozzle is a quick-release-type connector.

18. The gas delivery system of claim 13 further comprising means for inhibiting movement of the base section relative to the supply nozzle until a predetermined amount of force is exceeded.

19. A method of disconnecting a first connector mated with a second connector from the second connector, the method comprising:

engaging a lip of the first connector with a first section of a disconnect apparatus;

moving a second section of the disconnect apparatus that is concentric with the first section out of plane with respect to the first section while applying force against the lip with the first section; and moving a third section that is concentric with the first and second sections of the disconnect apparatus out of a plane defined by the first section while applying force against the lip with the first section.

20. The method of claim 19 wherein the first section applies force against the lip by engaging conduit engaging structure of the disconnect apparatus with a conduit, the conduit engaging structure being coupled to the second section.

* * * * *